Patented June 1, 1937

2,082,568

UNITED STATES PATENT OFFICE 2,082,568

VINYLETHINYL DERIVATIVES AND PROCESSES FOR PRODUCING SAME

Wallace H. Carothers, Arden, and Gerard J. Berchet, Wilmington, Del., assignors to E. I. du Pont de Nemours & Company, Wilmington, Del., a corporation of Delaware No Drawing. Original application November 11, 1931, Serial No. 574,456. Divided and this application June 16, 1934, Serial No. 730,912

12 Claims. (Cl. 260—170)

This invention relates to the preparation of derivatives of vinylacetylene. More particularly it relates to the preparation of derivatives of vinylacetylene in which the acetylenic hydrogen atom has been replaced. Still more particularly it relates to the preparation of these substituted vinylacetylenes from organo metallic derivatives of vinylactylene. Still more particularly it relates to the reactions of vinylethinyl magnesium compounds with compounds containing an inorganic strong acid radical.

This application is a division of application, Serial No. 574,456, filed November 11, 1931, now U. S. Patent 1,963,935, which describes the preparation of the vinylethinyl magnesium compounds which are used in the process of the present invention. These vinylethinyl magnesium compounds are ordinarily represented by the formula:

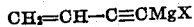

in which formula "X" represents a halogen atom. Nevertheless it is recognized that the compounds may have the formula:

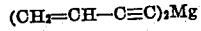

or that compounds of these two formulae may be in equilibrium with each other in mixture. For the purpose of the present invention the form in which these compounds exists is not material.

It is an object of the present invention to produce new derivatives of vinylactylene. A further object of the invention is to produce these new derivatives by reacting an organo metallic derivative of vinylacetylene with a compound containing an inorganic strong acid radical. Other objects will appear hereinafter.

These objects are accomplished by reacting a vinylethinyl magnesium compound, prepared as described hereinafter, with a compound containing an inorganic strong acid radical. Among these may be mentioned organic halides, such as triphenyl chloro methane, benzyl chloride, allyl bromide, ethyl iodide, heptyl chloride, butyl bromide, esters of sulfuric acid, such as, diethyl sulfate, dibutyl sulfate, dimethyl sulfate, alkyl esters of aryl sulfonic acids, such as butyl para-toluene sulfonate, ethyl xylene sulfonate and amyl benzene sulfonate. The course of these reactions is illustrated by the following equations:

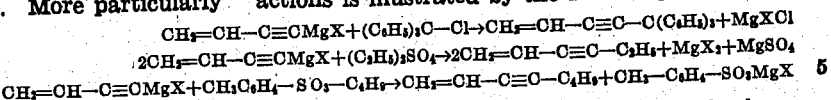

Other halides than those mentioned above may be used including halides of mercury, silicon, germanium, tin, phosphorus, arsenic, antimony and bismuth. The nature of the reaction of these latter materials with the vinylethinyl magnesium compounds is illustrated by the following equations:

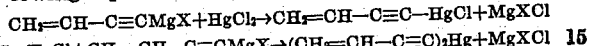

It is evident, therefore, that the process of the present invention makes it possible to prepare a great variety of new compounds. The compounds produced by the interaction of the vinylethinyl magnesium compounds and a reactive agent in the manner described above, are substituted monovinylacetylenes in which a substituent group other than hydrogen is attached to the alpha carbon atom of the acetylenic group.

As disclosed in U. S. Patent 1,963,935 it has been discovered that monovinyl acetylene may be converted into derivatives in which the acetylenic hydrogen atom has been replaced by magnesium; i. e., into vinylethinyl magnesium compounds. One method of preparing these compounds consists in treating monovinylacetylene,

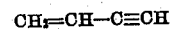

with an organo-magnesium compound derived from an alkyl or an aryl halide and metallic magnesium. Solutions containing such organo-magnesium compounds (Grignard reagents) are readily prepared by the well-known method of treating an alkyl or aryl halide with metallic magnesium in the presence of a suitable solvent such as an ether or a tertiary amine, or a hydrocarbon solvent containing an ether or a tertiary amine.

The Grignard reagents prepared by this method are usually represented by the formula RMgX in which R is a hydrocarbon radical and X is a halogen atom although it is recognized (cf. Noller, J. Am. Chem. Soc., 53,635 (1931)) that they may have the formula $R_2Mg$, or that they may be in equilibrium with the compounds of the formula $R_2Mg$. It is recognized also that such reagents usually exist in solution in a state of chemical combination with the (ether)

solvent, but this combined ether does not participate in the reactions of the Grignard reagents.

A solution of the Grignard reagent such as an ethereal solution is brought together with monovinylacetylene, whereupon a vigorous reaction takes place in accordance with the following equation:

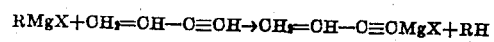

or

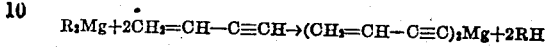

The reagent RMgX (R$_2$Mg) is destroyed, the alkyl or aryl radical R being converted into the corresponding hydrocarbon RH which, according to its boiling point, may be evolved as a gas or may remain in solution, and there results a solution which contains as its active ingredient a vinylethinyl magnesium derivative. This derivative may be considered as corresponding to the formula $CH_2=CH-C\equiv C-MgY$ in which Y represents a halogen atom or a vinylethinyl group. This solution may be used immediately to react with a compound such as an organic halide, etc., as disclosed above. Because of the reactivity of the vinylethinyl magnesium compounds, their solutions are preferably stored in completely filled, tightly closed containers in a cool, dark place. Under these conditions they can be kept for a long period of time without significant deterioration. For the purpose of using the vinylethinyl magnesium compounds as reagents to effect chemical transformations it is not necessary, and in general it is not desirable to attempt to separate or isolate them from the solutions in which they are formed.

In preparing vinylethinyl magnesium compounds according to the method of the present invention we may use as the reactant an organomagnesium compound (Grignard reagent) prepared from any alkyl or aryl halide and metallic magnesium. Thus, we may prepare the reagent by treating metallic magnesium with methyl chloride, methyl bromide, methyl iodide, ethyl chloride, bromide, or iodide, phenyl chloride, bromide or iodide, etc. For small scale preparations methyl bromide or ethyl bromide is a preferred halide on account of the ease with which it is handled; for large scale preparations methyl chloride or ethyl chloride is preferred because of its cheapness.

As stated above, such a Grignard reagent is mixed with monovinylacetylene so as to bring about a reaction resulting in the formation of the vinylethinyl magnesium compound. This mixing may be brought about in any suitable manner, but it is necessary to take into account the fact that monovinylacetylene at ordinary temperatures and pressures is a gas (B. P. 6° C.). A preferred method of bringing about the mixing is to introduce the gaseous monovinylacetylene in a fine stream under the surface of the Grignard reagent which is contained in a cooled vessel provided with a reflux condenser. It is desirable, though not necessary, to stir the reaction mixture during this process with the aid of a mechanical stirrer. After the calculated amount of monovinylacetylene has been introduced (one mol. for one mol. of Grignard reduced agent) the mixture can be heated for a short time so that it refluxes gently to insure completion of the reaction. Another method is to add the monovinylacetylene slowly in liquid form from a refrigerated container. The monovinylacetylene can also be dissolved in a solvent such as ether or benzene. It is also possible to add a solution of the Grignard reagent to the liquid or dissolved monovinylacetylene, but in general it is easier to avoid losses if the monovinylacetylene is added to the Grignard reagent. It is preferable in any event to use a slight excess of the monovinylacetylene to insure complete utilization of the initial Grignard reagent.

By way of illustration we present the following examples:

EXAMPLE I

Seventy-two grams of magnesium in the form of shavings are placed in a flask provided with a reflux condenser, a mechanical stirrer and (near the bottom) an inlet tube for gas. The magnesium is covered with 1200 cc. of dry diethyl ether. The stirrer is started and a few drops of methyl iodide are added to the mixture. As soon as the magnesium has been slightly etched by the action of the methyl iodide, a slow stream of methyl chloride is introduced thru the gas inlet tube. The magnesium gradually dissolves to form a solution of methyl magnesium chloride. When all the magnesium has gone into solution, the gas inlet tube is disconnected from the methyl chloride tank and connected to a vessel containing monovinylacetylene. The reaction flask is cooled with an ice bath and a stream of monovinylacetylene is passed in through the gas inlet tube at such a rate that the ether refluxes only very slowly. After 172 g. of monovinylacetylene have been introduced, the reaction is practically complete. To insure complete reaction the solution is gently heated to reflux for a short time. The solution now contains the equivalent of about 2.7 mols of vinylethinyl magnesium chloride.

EXAMPLE II

One liter of a 3 molar solution of ethyl magnesium bromide in dry ether is prepared from ethyl bromide and magnesium by the usual method. This solution is placed in a flask provided with a reflux condenser cooled with brine (about —10° C.), a mechanical stirrer, and a refrigerated dropping funnel. In the dropping funnel are placed 3.5 mols of monovinylacetylene. The flask is cooled with a bath of ice and salt and the liquid monovinylacetylene is allowed to run slowly into the stirred solution. The reaction proceeds smoothly with the evolution of ethane, most of which escapes through the top of the reflux condenser. After the addition of all the monovinylacetylene the mixture is gently heated for 30–45 minutes. The reaction is then complete and the solution contains nearly the theoretical amount of vinylethinyl magnesium bromide or its equivalent.

While the above description would indicate that the vinylethinyl magnesium compounds are prepared and isolated before reaction with the compounds having the inorganic strong acid radical, this is not necessary and, in general, is not desirable. Instead the reaction mixture in which the vinylethinyl magnesium compounds are formed may be treated directly with the material with which it is desirable to cause them to react.

It should be mentioned that all vinylethinyl compounds having two or more vinylethinyl groups show a great tendency to polymerize and this tendency in certain cases is so great as to make it difficult, or impossible, to isolate the compound as such in an unpolymerized state.

In carrying out the process of the present invention we bring together and mix any reactant of the type already indicated with a solution of a vinylethinyl magnesium halide prepared by the process described above. Reaction usually occurs smoothly and rapidly at the ordinary temperature or even at temperatures as low as $-10°$ C. In certain cases, however, it is necessary to heat the mixture to as high a temperature as $120°$ C. to cause the reaction to be completed. A preferred method of bringing about the mixing is to place the solution of the vinylethinyl magnesium halide in a vessel provided with a mechanical stirrer and a well cooled reflux condenser, and to add the reactant slowly or in small portions from a suitable container. The reactant may be added as such or, as is especially convenient in case the reactant is a solid, it may be dissolved in a solvent such as dry ether or benzene. In certain cases it is better to add the vinylethinyl magnesium halide to the reactant. It is important to have the reactant and any liquid in which it may be dissolved free of water, alcohol, etc., and it is desirable to exclude atmospheric moisture and carbon dioxide from the reaction vessel with the aid of a soda-lime trap. The rate of adding the reactant should be regulated so that the reaction does not become so vigorous as to cause violent refluxing. After all the reactant has been added it is usually advisable to heat the mixture so that it boils gently for a short time (15 to 60 minutes) to insure completion of the reaction. The product of the reaction usually remains dissolved in the reaction mixture. To isolate it, the solution is treated with ice-cold dilute mineral acid or ammonium chloride solution, the aqueous layer is removed, the organic layer is washed with water and dried, and the solvent is allowed to evaporate or distill. The product thus isolated can usually be purified by distillation or crystallization.

The nature of the present invention may be better understood from the following example which is not to be construed as limiting the invention but which is inserted to better illustrate the manner in which the reactions of the present invention are carried out. It will be understood that the triphenyl chloro methane used in this example may be replaced by any of the compounds containing an inorganic strong acid radical, described above.

EXAMPLE III

*Preparation of a hydrocarbon containing the vinylethinyl group*

A slight excess of vinylethinyl magnesium bromide is treated with a solution of 10 grams of triphenyl chloromethane in anhydrous ether. After the completion of the reaction, the mixture is worked up by treating with water and dilute acid, separating the ethereal layer, and allowing the ether to evaporate. This yields 7.5 grams of a crystalline solid, vinylethinyl triphenyl methane. This new compound melts at 134–135° C.

It will be understood that the invention as described above is susceptible of various modifications. Any variations from the illustrations and description embodied herein, which conform to the spirit of the invention, are intended to be embraced within the scope of the claims.

We claim:

1. The process which comprises reacting a compound corresponding to the formula:

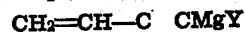

in which Y represents a halogen atom or a vinylethinyl group, with a compound containing an inorganic strong acid radical of the class consisting of alkyl halides, aralkyl halides, alkyl sulfates and alkyl esters of aryl sulfonic acids.

2. The process which comprises reacting a compound of the general formula:

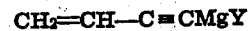

in which Y represents a halogen atom or a vinylethinyl group with an alkyl ester of an inorganic strong acid.

3. The process which comprises reacting a compound of the general formula:

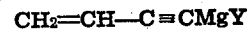

in which Y represents a halogen atom or a vinylethinyl group with triphenyl chloromethane.

4. The process which comprises reacting monovinylacetylene with a Grignard reagent, then treating the reaction product with a compound containing an inorganic strong acid radical of the group consisting of alkyl halides, aralkyl halides, alkyl sulfates and alkyl esters of aryl sulfonic acids.

5. A process as described in claim 1 characterized in that the Grignard derivative of monovinylacetylene is added gradually to the compound containing the inorganic strong acid radical in the presence of an inert diluent.

6. A process as described in claim 1 characterized in that the compound containing the inorganic strong acid radical is added gradually to the Grignard derivative of monovinylacetylene in the presence of an inert diluent.

7. The process of claim 1 characterized in that the reaction is carried out in the presence of ether as a diluent.

8. The process of claim 1 characterized in that it is carried out in the presence of an inert diluent and in the absence of water and carbon dioxide.

9. The process which comprises adding an alkyl sulfate, in portions, in the presence of ether as a diluent, to a compound obtainable by adding a Grignard reagent to monovinylacetylene, heating the resulting mixture to a gentle boiling and thereafter separating an alkyl vinylethinyl compound.

10. The process which comprises adding an alkyl ester of an aryl sulfonic acid, in portions, in the presence of ether as a diluent, to a compound obtainable by adding a Grignard reagent to monovinylacetylene, heating the resulting mixture to gentle boiling and thereafter separating an alkyl vinylethinyl compound.

11. A process as described in claim 1 characterized in that the compound containing the inorganic strong acid radical is added in portions to the magnesium compound in the presence of an inert diluent and in that an alkyl vinylethinyl compound is separated from the mixture resulting from the reaction.

12. The process which comprises adding a solution of triphenyl chloromethane in anhydrous ether to a slight excess of vinylethinyl magnesium bromide, then after completion of the reaction adding water and dilute acid, separating the ethereal layer and allowing the ether to evaporate.

WALLACE H. CAROTHERS.
GERARD J. BERCHET.

Certificate of Correction

Patent No. 2,082,568. June 1, 1937.

WALLACE H. CAROTHERS, ET AL.

It is hereby certified that error appears in the printed specification of the above numbered patent requiring correction as follows: Page 3, second column, line 3, claim 1, strike out the formula and insert instead the following: $CH_2=CH-C\equiv CMgY$; and that the said Letters Patent should be read with this correction therein that the same may conform to the record of the case in the Patent Office.

Signed and sealed this 24th day of August, A. D. 1937.

[SEAL]

LESLIE FRAZER,
*Acting Commissioner of Patents.*